(12) United States Patent
Evans

(10) Patent No.: US 8,027,435 B2
(45) Date of Patent: *Sep. 27, 2011

(54) METHOD AND SYSTEM FOR PROTOCOL EMBEDDED AUTOMATED TEST CONTROL

(75) Inventor: Jeffrey R. Evans, Lovettsville, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/828,685

(22) Filed: Jul. 1, 2010

(65) Prior Publication Data

US 2010/0268992 A1   Oct. 21, 2010

Related U.S. Application Data

(63) Continuation of application No. 11/956,091, filed on Dec. 13, 2007, now Pat. No. 7,787,599.

(51) Int. Cl.
*H04M 3/42* (2006.01)
(52) U.S. Cl. .................................................. 379/15.03
(58) Field of Classification Search ............ 379/13, 379/15, 3
See application file for complete search history.

(56) References Cited

U.S. PATENT DOCUMENTS

| | | | | |
|---|---|---|---|---|
| 5,953,989 | A * | 9/1999 | Uchiyama et al. | 101/129 |
| 5,970,120 | A * | 10/1999 | Kasrai | 379/9 |
| 6,016,334 | A * | 1/2000 | Kasrai | 379/10.03 |
| 6,088,434 | A * | 7/2000 | Kasrai | 379/201.12 |
| 6,104,796 | A * | 8/2000 | Kasrai | 379/201.12 |
| 6,272,208 | B1 * | 8/2001 | Kasrai | 379/15.03 |
| 6,674,840 | B1 * | 1/2004 | Contractor | 379/15.03 |

* cited by examiner

*Primary Examiner* — Amine Riad

(57) ABSTRACT

A method and system of an embodiment may include executing a first test case using a user record provisioned on a network, the first test case comprising transmitting at least a first portion of the data to a network element being tested and receiving a response from the network element being tested in the first test case based at least in part on the configuration data for the first test case contained in the transmitted first portion of the data, executing a second test case using the user record provisioned on the network, the second test case comprising transmitting at least a second portion of the data to a network element being tested and receiving a response from the network element being tested in the second test case based at least in part on configuration data for the second test case contained in the transmitted second portion of the data.

21 Claims, 4 Drawing Sheets

METHOD AND SYSTEM FOR PROTOCOL EMBEDDED AUTOMATED TEST CONTROL

CROSS-REFERENCE TO RELATED APPLICATIONS

The present application is a continuation of U.S. patent application Ser. No. 11/956,091 filed Dec. 13, 2007 entitled "METHOD AND SYSTEM FOR PROTOCOL EMBEDDED AUTOMATED TEST CONTROL," the disclosure of which is hereby incorporated by reference in its entirety.

BACKGROUND INFORMATION

Automated testing of complex networks can involve numerous network elements which may work independently. For complex testing scenarios it is frequently necessary to coordinate activities on two or more network elements involved in a test. Typically, this may involve the provisioning of user records or subscriber records on the network for each individual test case. For complex networks the number of test cases can be in the hundreds or even thousands. This quickly results in a large number of subscriber or user records required to be provisioned on a network for testing. The provisioning of these records can be difficult to manage, time consuming and expensive.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a system for protocol embedded automated test control. The system enables a user to test a complex network utilizing configuration data or protocols contained within test data to reduce the number of user or subscriber records required to be provisioned on a network.

Figure 1:
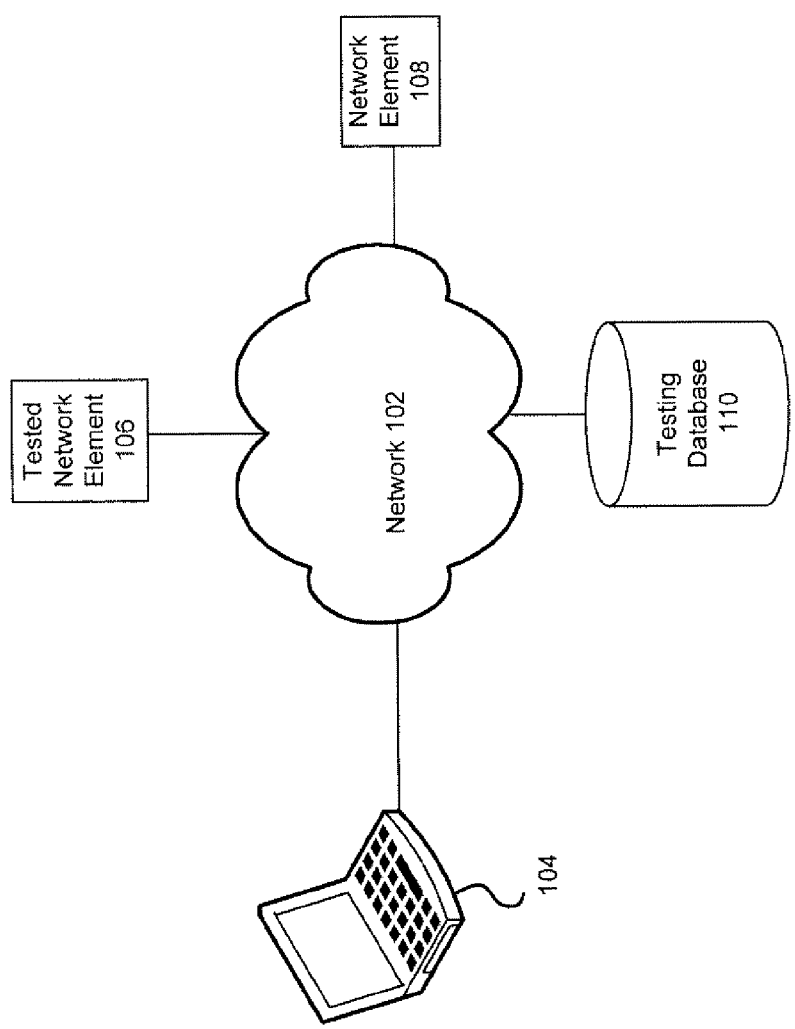
FIG. 1 depicts a system for protocol embedded automated test control utilizing a programmable network element as a test responder, in accordance with an exemplary embodiment.

Referring to FIG. 1, a system for protocol embedded automated test control utilizing a programmable network element as a test responder, in accordance with an exemplary embodiment is illustrated. FIG. 1 is a simplified view of system 100 and may include additional elements that are not depicted. As illustrated, test driver 104 may be communicatively coupled to network 102. Network 102 may be communicatively coupled to additional network elements including tested network element 106 and network element 108. One or more databases may be communicatively coupled to network 102 including testing database 110.

Tested network element 106, network element 108, test driver 104 and testing database 110 may transmit and/or receive testing data for one or more test cases to and/or from network 102. The testing data may be transmitted and/or received utilizing a standard telecommunications protocol or a standard networking protocol. For example, one embodiment may utilize Session Initiation Protocol (SIP). In other embodiments, the testing data may be transmitted and/or received utilizing other Voice Over IP (VOIP) protocols. For example, testing data may also be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving testing data. Testing data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Tested network element 106, network element 108, test driver 104 and testing database 110 may use standard wireless protocols including IEEE 802.11a, 802.11b and 802.11g. Tested network element 106, network element 108, test driver 104 and testing database 110 may also be connected to network 102 via protocols for a wired connection, such as an IEEE Ethernet 802.3.

Network 102 may be a local area network (LAN), a wide area network (WAN), the Internet, cellular networks, satellite networks, an advanced intelligent network or other networks that permit the transfer and/or reception of data to and/or from tested network element 106, network element 108, test driver 104 and testing database 110. Network 102 may utilize one or more protocols of tested network element 106, network element 108, test driver 104 and testing database 110. Network 102 may translate to or from other protocols to one or more protocols of tested network element 106, network element 108, test driver 104 and testing database 110. Network 102 may be a network utilized for testing and integrating one or more network components into a network, such as an advanced intelligent network.

Tested network element 106 and network element 108 may be one or more servers (or server-like devices), such as Session Initiation Protocol (SIP) servers. Tested network element 106 and network element 108 may include one or more processors (not shown) for recording, transmitting, receiving and/or storing data. Although tested network element 106 and network element 108 are depicted as single servers, it should be appreciated that the contents of tested network element 106 and network element 108 may be combined into fewer or greater numbers of servers (or server-like devices) and may be connected to one or more data storage systems. Furthermore, tested network element 106 and network element 108 may be local, remote, or a combination thereof to each other.

Test driver 104 may be a desktop, a laptop, a server or other computer capable of utilizing testing automation software. Test driver 104 may read one or more test records to transmit test data to one or more network elements being tested. Test driver 104 may generate phone calls or other data transmissions to one or more network elements, such as tested network element 106 as part of a test case. Test driver 104 may transmit test data having embedded configuration information. The configuration information may enable a test responder, such as network element 108, to identify a test case as well as the appropriate response to a test case. In one or more embodiments, test driver 104 may use a portion of a phone number, such as the last four digits of a calling party phone number transmitted in the test data to identify a test case. For example, test driver 104 may call tested network element 106, the network element being tested, and may call provisioned number (301) 123-1234 from a calling party number of (202) 123-0001. Tested network element 106 may receive the call and may query network element 108 for information on how to respond to the call. Network element 108 may be programmed to parse the test data according to a predetermined protocol and extract the test case identifier. Network element 108 may then follow preprogrammed logic to respond to the appropriate test case. In this example, the last four digits of the calling party's number "0001" is interpreted by network element 108 to equate to test case number 1. Network element 108 may use stored logic or may query one or more network resources to determine that a call for test case number one is to be routed to (301) 987-6543. A second test case, may involve test driver 104 calling tested network element 106 on the same provisioned number, (301) 123-1234, from a calling party number of (202) 123-0002. Tested network element 106, the system being tested, may query network element 108 for information on how to respond to the call. Network element 108 may parse the last four digits of the calling party's number "0002" and may determine that the logic for test case number 2 should be utilized. Network element 108 may forward the call to (202) 234-5678. Network driver 104 and network element 108 may provide a variety of embedded test case identifiers in one or more fields and may additionally pass numbers or other identifiers which may correspond to an appropriate network action to take for a test case. Other additional test cases may be run over the same provisioned number and may thus enable one or more network testers to run multiple test cases requiring only the subscriber records for (301) 123-1234 already provisioned on the network In another example, test driver 104 may embed a test identifier in a subscriber identifier or a user identifier. Test driver 104 may embed other configuration data or control codes in the test data which may specify desired actions, responses or characteristics for a test case. For example, a test driver testing a system providing data connections to one or more users may embed control codes specifying a quality of service to be provided for the test connection, a bandwidth to be provided for the test connection, one or more network addresses to be assigned and/or other characteristics to be set for a test case. Tested network element 106 being tested by test driver 104 may receive data properly formatted and data which falls within acceptable testing constraints. The tested network element 106 may be unaware of embedded configuration information. The tested network element 106 may therefore be tested under proper conditions, e.g. as if it were on the actual production network receiving live data corresponding to the situation a particular test case was designed to test. Other network elements or test responders which interact with tested network element 106, the network element being tested, may however parse the embedded configuration information and may produce a desired response to tested network element 106. The embedding of configuration information in the test data and its interpretation by test driver 104 or test responders, such as network element 108, may enable the testing of a complex network requiring a significantly reduced amount of subscriber or user information to be provisioned on the network. The number of provisioned records may reflect the number required for a single test case, the number of different types of service to be tested or the number of different types of equipment to be tested or other test dependent factors. The number of provisioned records for test dependent factors may thus be closer to provisioning one set of records per type of test which may be a significant reduction from provisioning a set of records for each test. In some embodiments, provisioned records may be reused for different types of tests and may further reduce the need for provisioning additional subscriber or user records on a test network.

Test driver 104 may read one or more test records from local storage, from testing database 110 or from other storage to which it is communicatively coupled. Test driver 104 may utilize only a portion of the one or more test records for a single test case and may transmit that portion for the running of the test case. In some embodiments, test driver 104 may read data providing a template for a test case and may automatically increment or modify one or more portions of the data to represent data for a particular test case. Test driver 104 may combine one or more portions of data from separate sources to generate one or more test cases. Test driver 104 may communicate with a network element 108 or a test responder to provide logic or data for parsing configuration data for one or more test cases.

Network element 108 may be a test responder for one or more test cases involving tested network element 106. Network element 108 may be a service switching point, a signaling gateway, a service control point, a service data point, an intelligent peripheral, an application server, a session initiation protocol server, or a network node capable of being programmed to parse embedded configuration data from testing data and producing a desired response. Network element 108 may parse one or more portions of data received from tested network element 106, such as a calling party identifier, or calling party number, a dialed number, a called party number, or a called party identifier to determine an appropriate response to a network element currently being tested, such as tested network element 106. Network element 108 may be programmed with logic mapping an appropriate response to configuration data embedded in received test data. The programmed logic may be compatible with logic which may be used to embed appropriate test configuration data by test driver 104. Network element 108 may also query one or more network elements or network resources to determine an appropriate response. For example, network element 108 may query testing database 110 or test driver 104 using a parsed test case identifier in order to obtain the appropriate response to return to a network element currently being tested.

Network element 108 may provide application programming interfaces (APIs), interface tables, remote procedure calls (rpcs), web services, Extensible Markup Language (XML) based interfaces, Simple Object Access Protocol (SOAP) based interfaces and other interfaces for sending or receiving test information. Network element 108 may receive data from test driver 104, database 110 or other network resources. Network element 108 may store test case parsing logic and rules locally or may utilize testing database 110 or other storage to which it is communicatively coupled. The APIs or interfaces of network element 108 may enable test driver 104 or another element to load test case data or logic on network element 108. Network element 108 may also contain a user interface for entering, viewing, or editing testing logic and data.

Testing database 110 may be a relational database, an object oriented database, one or more flat files, a service data point, networked storage or other storage communicatively coupled to network 102. Testing database 110 may be utilized to store test cases, test records, subscriber records, user records, test results, program logic, provisioning data and other testing related data.

Tested network element 106 may be a network element currently being tested. Tested network element 106 may be a service switching point, a signaling gateway, a service control point, a service data point, an intelligent peripheral, an application server, a session initiation protocol server, or a network node. Tested network element 106 may receive test data from one or more test drivers, such as test driver 104. Tested network element 106 may process the test data as part of a desired test operation without interpreting the embedded configuration data. The embedded configuration data may enable a second network element interacting with tested network element 106 to provide a response desired for a specified test case to tested network element 106. For example, tested network element 106 may be a service switching point of an advanced intelligent network. Tested network element 106 may receive a phone call from test driver 104. Tested network element 106 may send a query to network element 108, which may be a service control point, to determine how to handle the call. The query may contain one or more portions of data received from test driver 104, such as a calling party identifier, calling party number, a dialed number, a called party number, or a called party identifier. Network element 108 may parse the last four numbers of a calling party number which may provide a first test case identifier. Network element 108 may lookup the first test case identifier or may apply predetermined logic to the first test case identifier to determine the routing of the call. A second query received by network element 108 from tested network element 106 may be parsed to provide a second test case identifier. Network element 108 may lookup the second test case identifier or may apply predetermined logic to the second test case identifier to determine that the call is to be routed to a second destination number, to be terminated, to be transferred to voicemail or to have another action performed in accordance with the specified test case. Both test cases may utilize a single provisioned number on the network and may thus reduce the need for additional subscriber records for multiple test cases. This example may be extended to accommodate additional test cases also utilizing the single subscriber number. In some embodiments or for some test cases it may be necessary to provision additional user or subscriber records. However, the programmability of network element 108 and the use of embedded test case configuration information in test data may enable the reduction of user or subscriber records required to be provisioned on a network.

The various components of system 100 as shown in FIG. 1 may be further duplicated, combined and/or integrated to support various applications and platforms. Additional elements may also be implemented in the systems described above to support various applications.

Figure 2:
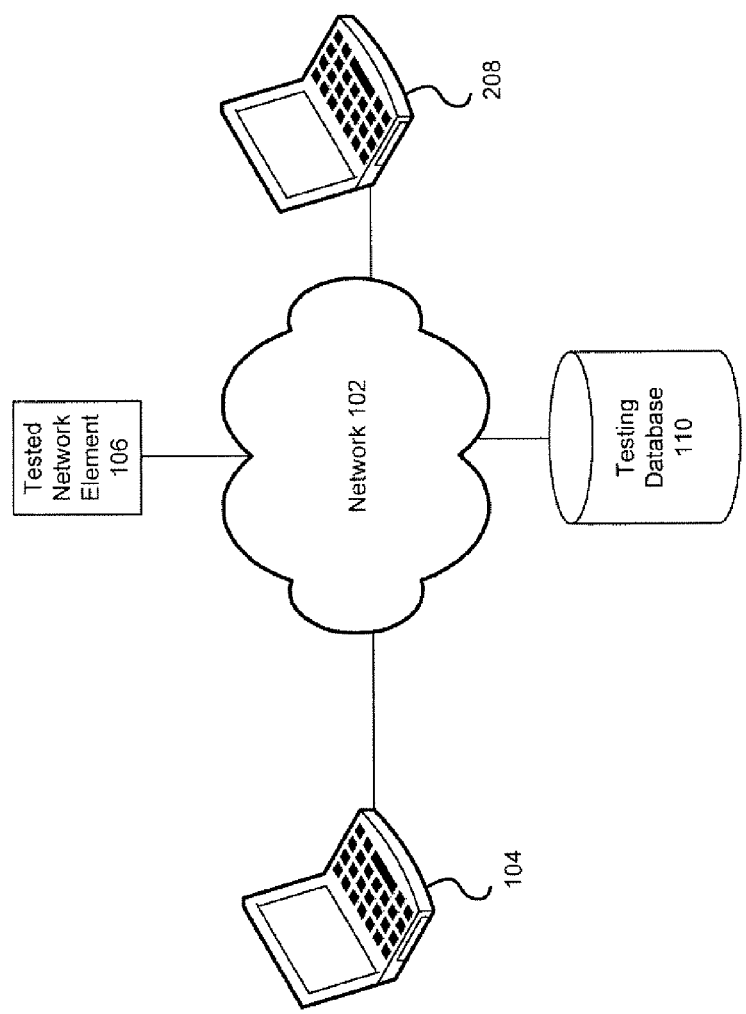
FIG. 2 depicts a system for protocol embedded automated test control utilizing a computer with test automation software as a test responder, in accordance with an exemplary embodiment.

Referring to FIG. 2, a system for protocol embedded automated test control utilizing a computer with test automation software as a test responder, in accordance with an exemplary embodiment. FIG. 2 is a simplified view of system 200 and may include additional elements that are not depicted. As illustrated, FIG. 2 may contain many of the same elements as discussed in reference to FIG. 1, including, test driver 104, tested network element 106, network 110 and testing database 110. FIG. 2 may include test responder 208.

Test responder 208 may be utilized to provide interaction with a system under test to interpret embedded configuration data and to provide appropriate responses to test data for one or more test cases. Test responder 208 may be a laptop, desktop, server, personal digital assistant (PDA) or other computer capable of interpreting embedded configuration data and providing appropriate responses to test data for one or more test cases. Test responder 208 may utilize testing automation software. Test responder 208 may be used to emulate one or more pieces of network equipment interacting with a system under test, such as tested network element 106. Test responder 208 may be useful when it is easier to emulate the response provided by network equipment rather than programming the equivalent network equipment to parse embedded configuration data and to respond appropriately. Test responder 208 may also accommodate multiple network addresses and may emulate multiple network elements.

Test responder 208 may be programmed with logic mapping an appropriate response to configuration data embedded in received test data. The programmed logic may be compatible with logic which may be used to embed the appropriate test configuration data by test driver 104. Test responder 208 may also query one or more network elements or network resources to determine an appropriate response. For example, test responder 208 may query testing database 110 or test driver 104 using a parsed test case identifier to obtain the appropriate response to return to a network element currently being tested. Test responder 208 may provide additional options for testing including test diagnostic information, logging, reporting, the ability to retry a response, the ability to roll back or undo a testing transaction and other testing options.

Test responder 208 may provide application programming interfaces (APIs), interface tables, remote procedure calls (rpcs), web services, Extensible Markup Language (XML) based interfaces, Simple Object Access Protocol (SOAP) based interfaces and other interfaces for sending or receiving test information. Test responder 208 may receive data from test driver 104, database 110 or other network resources. Test responder 208 may store test case parsing logic and rules locally or may utilize testing database 110 or other storage to which it is communicatively coupled. The APIs or interfaces of test responder 208 may enable test driver 104 or another network element to load test case data or logic on test responder 208. Test responder 208 may also contain a user interface for entering, viewing and/or editing testing logic and data.

In one or more embodiments, test responder 208 may be used to emulate an application server interacting with a system under test, such as tested network element 106. Test responder 208 may receive a service request, such as a web service request, from tested network element 106. Test responder 208 may parse the service request and may retrieve a test case identifier from a subscriber identification field. The test case identifier may correspond to a first test case requiring a simple extensible markup language (XML) response. Test responder 208 may provide a simple XML response to tested network element 106. Test responder 208 may receive a second service request from tested network element 106 and may parse it to retrieve a second test case identifier from a subscriber identification field. Test responder 208 may query one or more network elements or may use programmed logic to determine an appropriate response. The second test case identifier may correspond to a test case requiring a complex XML response from the emulated application server. Test responder 208 may respond accordingly.

The various components of system 200 as shown in FIG. 2 may be further duplicated, combined and/or integrated to support various applications and platforms. Additional elements may also be implemented in the systems described above to support various applications.

Figure 3:
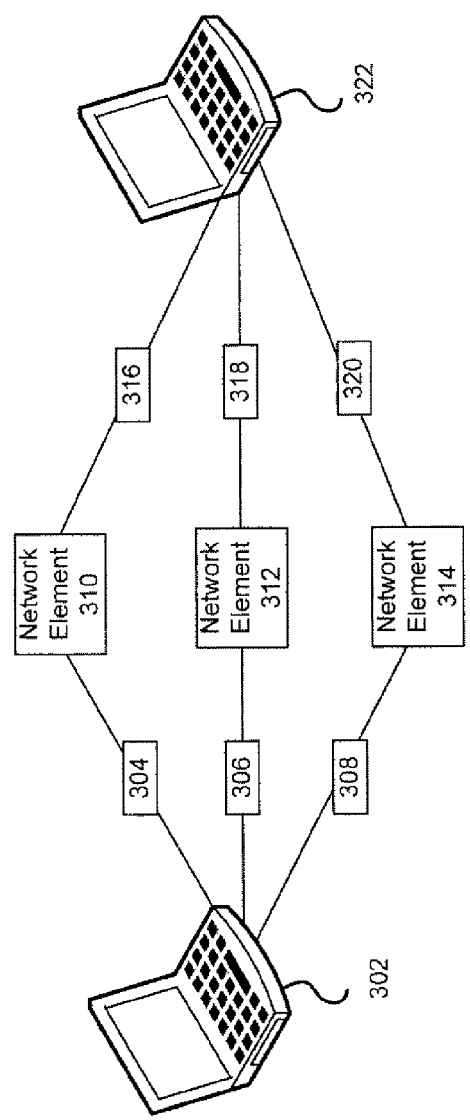
FIG. 3 depicts a system for protocol embedded automated test control testing multiple network elements, in accordance with an exemplary embodiment.

Referring to FIG. 3, a system for protocol embedded automated test control testing multiple network elements is illustrated, in accordance with an exemplary embodiment. FIG. 3 is a simplified view of system 300 and may include additional elements that are not depicted. As illustrated, FIG. 3 may contain test driver 302, network paths 304, 306, 308, 316, 318, 320, network elements 310, 312, 314, and test responder 322.

Test driver 302 may be a desktop, a laptop, a server or other computer capable of utilizing testing automation software. Test driver 302 may read one or more test records to transmit test data to one or more network elements being tested. Test driver 302 may generate phone calls or other data transmissions to one or more network elements as part of a test case. Test driver 302 may transmit test data containing configuration information embedded in the test data enabling the identification of a response to a test case. Test driver may contain one or more of the capabilities or characteristics of test driver 104 of FIG. 1. Test driver 302 may also test one or more network elements depending on the embedded test configuration data. For example, depending on a calling party area code test driver 302 may transmit data to network element 310 utilizing network path 304, to network element 312 utilizing network path 306, or to network element 314 utilizing network path 308.

Network elements 310, 312 and 314 may represent network elements being tested. Network elements 310, 312 and 314 may be service switching points, signaling gateways, service control points, service data points, intelligent peripherals, application servers, session initiation protocol servers, or network nodes. Network elements 310, 312 and 314 may contain one or more of the capabilities or characteristics of tested network element 106. Network elements 310, 312 and 314 may send one or more requests utilizing corresponding network paths 316, 318 and 320 to test responder 322.

Test responder 322 may contain one or more of the capabilities or characteristics of test responder 208. Test responder 322 may parse configuration information from a request from a network element to determine a test case identifier or other indicators which may be used to lookup or generate an appropriate response. Test responder 322 may also parse additional configuration or control information to determine which network element to respond to. For example, test responder 322 may receive a request from network element 310 on network path 316. Test responder 322 may parse the request and extract a calling party number. The area code may have been parsed by test driver 302 to send a transmission to network element 310. However, test responder 322 may parse the last four digits of the calling party number to obtain a test case identifier. Test responder 322 may also parse the first three digits of the local number which may map to network element 314. Thus test responder 322 may send a response to network element 314. By parsing one or more portions of one or more fields of test data, a test responder or test driver may provide additional flexibility in handling test cases. This may enable a test responder or a test driver to test multiple network elements under multiple test cases while reducing the number of provisioned user or subscriber records required on a network.

The various components of system 300 as shown in FIG. 3 may be further duplicated, combined and/or integrated to support various applications and platforms. Additional elements may also be implemented in the systems described above to support various applications.

Figure 4:
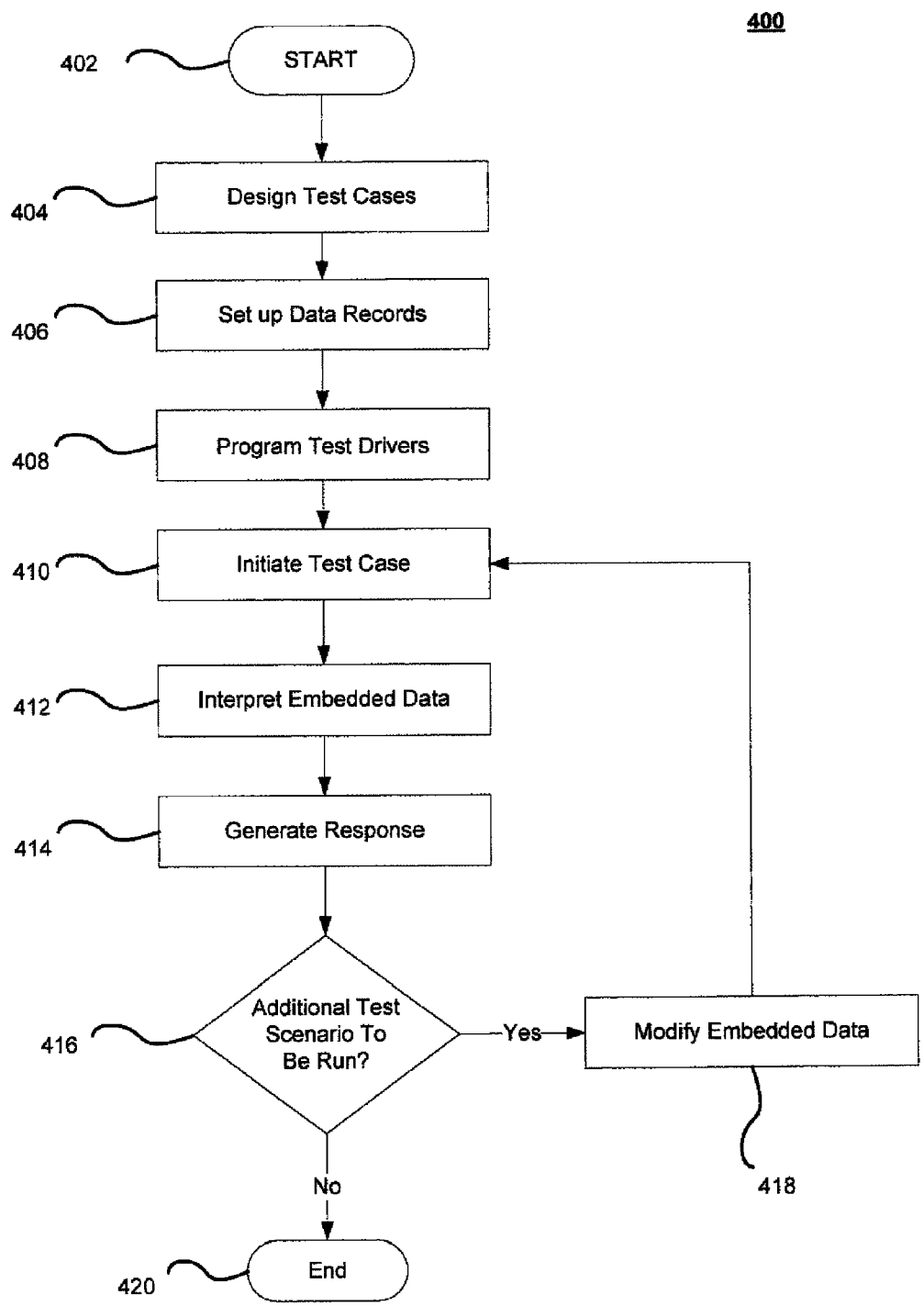
FIG. 4 depicts a method for protocol embedded automated test control, in accordance with an exemplary embodiment.

FIG. 4 illustrates a flow diagram of a method 400 for protocol embedded automated test control, in accordance with exemplary embodiment. This exemplary method 400 is provided by way of example, as there are a variety of ways to carry out the method. The method 400 shown in FIG. 4 can be executed or otherwise performed by one or a combination of various systems. The method 400 described below may be carried out by the protocol embedded automated test control system 100 shown in FIG. 1 by way of example, and various elements of the protocol embedded automated test control system 100 are referenced in explaining the exemplary method of FIG. 4. Each block shown in FIG. 4 represents one or more processes, methods or subroutines carried out in exemplary method 400. Referring to FIG. 4, exemplary method 400 may begin at block 402.

At block 404, the test cases may be designed. The design of the test cases may include the provisioning of one or more user or subscriber records and the design of the logic to be utilized by test drivers, test responders and/or programmable network elements to parse embedded control or configuration data from data records. The design of the test cases may include the design of the protocol or format of any embedded control or configuration data. The design of test cases may include which fields or portions of fields in the transmitted data to embed one or more control codes in, which control codes may be embedded in those fields, the appropriate response to the control codes, test case identifiers and other embedded control or configuration data details. The design of the test cases may include planning for lookups, APIs or services which may provide an appropriate response when queried using a test case identifier or a control code. The design of the test cases may include planning for one or more call generators or emulators.

At block 406, the data records may be setup. This may include one or more sets of test data which may correspond to provisioned subscriber or user records. The data records may be setup for every test case planned or template data records may be used and variables may be looked up and substituted into a template to create a data record for a test case as test cases are run.

At block 408, the test drivers, test responders and/or programmable network elements may be programmed to parse and interpret embedded control and/or configuration data from data records. The test drivers, test responders and/or programmable network elements may be programmed to lookup appropriate transmissions, responses or emulations from local storage or storage to which they are communicatively coupled. Test drivers and test responders or programmable network elements may be tested to test compatibility between the embedding of control codes and the parsing of and response to such control codes.

At block 410, a test case may be initiated. This may include a test driver such as test driver 104 or 302 initiating a transmission to a network element such as tested network element 106, or network elements 310, 312 or 314. A network element being tested, such as tested network element 106, or network elements 310, 312 or 314, may send a request to a test responder or a programmable network element.

At block 412, a test responder or a programmable network element, such as test responders 208 and 322 or network element 108, may receive the request. The test responder or network element may parse the request and interpret embedded data.

At block 414, the test responder or programmable network element may identify the test case or may use another identifier to determine the appropriate response to the request. The test responder may generate a response and send a response to one or more network elements being tested. The response may be sent to the network element from which the transmission was received or the response may be sent to one or more additional network elements which may be under test. The recipient of the response may be identified as part of the configuration data sent in the transmission, the recipient may looked up in a query by a responder, or the recipient may be set to a default value. In one or more embodiments, no response may be sent.

At block 416, the test driver, such as test driver 104 or 302, may determine if additional test cases need to be run. If there are no additional test cases, the method may proceed to block 420. If there are additional test cases the method may continue at block 418.

At block 418, the test driver or a separate system may modify the test data to contain embedded control data corresponding to an additional test case. In one or more embodiments, data may not be modified and new data for a subsequent test case may simply be fetched or retrieved from storage communicatively coupled to a test driver. The method may then return to block 410 to initiate a subsequent test case. Method 400 is not limited to a set number of iterations and may be repeated for one or more test cases. Iterations may occur automatically and may be controlled by a test driver. A test driver, such as test driver 104, may repeat method 400 to perform one or more test cases specified in data records stored on in storage communicatively coupled to test driver 104.

At block 420, the method may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer-implemented method, comprising:
creating one or more test records comprising test data and configuration data for two or more test cases;
executing a first test case using a user record provisioned on a network, the executing of the first test case comprising:
transmitting, using at least one programmed computer processor, at least a first portion of the test data to a network element being tested, the at least a first portion of the test data including a first portion of the configuration data; and
receiving a response from the network element being tested in the first test case based at least in part on the first portion of the configuration data;
executing a second test case using the user record provisioned on the network, the executing of the second test case comprising:
transmitting, using at least one programmed computer processor, at least a second portion of the test data to a network element being tested, the at least a second portion of the test data including a second portion of the configuration data; and
receiving a response from the network element being tested in the second test case based at least in part on the second portion of the configuration data.

2. The method of claim 1, wherein the network elements being tested in the first test case and the second test case are different.

3. The method of claim 1, wherein the first test case and the second test case are performed on the same network element.

4. The method of claim 1, wherein executing the first test case further comprises:
receiving test data at a second network element from the network element being tested, wherein the test data received is based at least in part on the test data transmitted to the network element being tested;
parsing the test data received at the second network element to identify first test case configuration data; and
sending a response from the second network element to the network element being tested, wherein the response is based at least in part on the identified first test case configuration data.

5. The method of claim 1, wherein executing the second test case further comprises:
receiving test data at a second network element from the network element being tested, wherein the test data received is based at least in part on the test data transmitted to the network element being tested;
parsing the test data received at the second network element to identify second test case configuration data; and
sending a response from the second network element to the network element being tested, wherein the response is based at least in part on the second test case configuration data.

6. The method of claim 1, further comprising: utilizing one or more electronic test drivers to modify test case configuration data to allow user records provisioned on a network to be reused for a plurality of test cases.

7. The method of claim 1, further comprising:
accessing a database communicatively coupled to the network, the database including one or more of: test cases, test records, subscriber records, user records, test results, program logic, and provisioning data.

8. The method of claim 1, wherein the user record comprises a subscriber record.

9. The method of claim 1, wherein the network comprises an advanced intelligent network.

10. The method of claim 1, wherein the data is transmitted by an electronic test driver comprising a computer utilizing test automation software.

11. The method of claim 1, wherein the network element being tested in the first test case comprises one of a service switching point, a signaling gateway, a service control point, a service data point, an intelligent peripheral, an application server, a session initiation protocol server, and a network node.

12. The method of claim 1, wherein the network element being tested in the second test case comprises one of a service switching point, a signaling gateway, a service control point, a service data point, an intelligent peripheral, an application server, a session initiation protocol server, and a network node.

13. The method of claim 4, wherein the second network element comprises one of a service control point, an application server, and a computer utilizing test automation software.

14. The method of claim 4, wherein the second network element is programmed to parse test case configuration data from data received and to respond based at least in part on the test case configuration data.

15. The method of claim 6, wherein the test case configuration data modified comprises one of subscriber identifying data, calling party identifying data and network user identifying data.

16. A system, comprising:
an electronic test driver communicatively coupled to a network wherein the electronic test driver is configured to:
execute two or more test cases on one or more network elements;
utilize one or more test records, wherein the one or more test records have test data containing configuration data for the two or more test cases;

execute a first test case utilizing one or more user records, wherein executing the first test case comprises:
  transmitting at least a first portion of the test data to a network element being tested; and
  producing a response from the network element being tested in the first test case based at least in part on configuration data for the first test case contained in the at least a first portion of the test data transmitted;
execute a second test case utilizing the one or more user records, wherein executing the second test case comprises:
  transmitting at least a second portion of the test data to a network element being tested; and
  producing a response from the network element being tested in the second test case based at least in part on configuration data for the second test case contained in the at least a second portion of the test data transmitted.

17. The system of claim 16, wherein the network elements being tested in the first test case and the second test case are different.

18. The system of claim 16, wherein executing the first test case further comprises:
receiving test data at a second network element from the network element being tested in the first test case, wherein the test data received is based at least in part on the test data transmitted to the network element being tested in the first test case;
parsing the test data received at the second network element to identify first test case configuration data; and
sending a response from the second network element to the network element being tested in the first test case, wherein the response is based at least in part on the first test case configuration data parsed from the test data received.

19. The system of claim 16, wherein executing the second test case further comprises:
receiving test data at a second network element from the network element being tested in the second test case, wherein the test data received is based at least in part on the data transmitted to the network element being tested in the second test case;
parsing the test data received at the second network element to identify second test case configuration data; and
sending a response from the second network element to the network element being tested in the second test case, wherein the response is based at least in part on the second test case configuration data parsed from the test data received.

20. The system of claim 16, further comprising: utilizing one or more electronic test drivers to modify test case configuration data to allow user records provisioned on a network to be reused for a plurality of test cases.

21. A computer-implemented method, comprising:
executing a first test case, wherein executing the first test case comprises:
  transmitting test data by an electronic test driver to a first network element, wherein the first network element is being tested and the test data is based at least in part on one or more test records;
  receiving test data at a second network element from the first network element, wherein the test data received is based at least in part on the test data transmitted to the first network element;
  parsing the test data received at the second network element to identify first test case configuration data;
  sending a response from the second network element to the network element being tested, wherein the response is based at least in part on the first test case configuration data parsed from the test data received;
utilizing the electronic test driver to automatically modify one or more portions of test data to be transmitted, wherein the test data to be transmitted is based at least in part on one or more test records, the modification changing the first test case configuration data to configuration data of a second test case, and the modification allowing a user record provisioned on a network to be reused for the second test case; and
executing the second test case, wherein executing the second test case produces a response based at least in part on the second test case configuration data.

* * * * *